United States Patent [19]

Dills

[11] 4,042,557

[45] Aug. 16, 1977

[54] PROCESS FOR PREPARING A HIGH CONCENTRATION OF TITANIUM DIOXIDE SLURRY IN DIMETHYLACETAMIDE OR DIMETHYLFORMAMIDE

[75] Inventor: William Leonard Dills, Wilmington, Del.

[73] Assignee: E. I. Du Pont de Nemours and Company, Wilmington, Del.

[21] Appl. No.: 609,714

[22] Filed: Sept. 2, 1975

[51] Int. Cl.$^2$ .......................... C08K 3/22; C08K 5/09; C08K 5/20; C09C 1/36
[52] U.S. Cl. .............................. 260/32.6 NR; 106/300; 260/31.8 C; 260/31.8 B; 260/31.8 G; 260/37 N
[58] Field of Search ............... 106/300; 260/32.6 NR, 260/31.2 N, 31.8 C, 37 N, 31.8 B, 31.8 G

[56] References Cited

U.S. PATENT DOCUMENTS

| | | | |
|---|---|---|---|
| 2,999,839 | 9/1961 | Arvidson et al. | 260/45.9 R |
| 3,630,987 | 12/1971 | Thoma et al. | 260/32.6 NR |
| 3,663,284 | 5/1972 | Stancioff et al. | 106/300 |
| 3,825,438 | 7/1974 | Pritchard et al. | 106/300 |
| 3,884,713 | 5/1975 | Langley et al. | 106/308 N |

*Primary Examiner*—Allan Lieberman

[57] ABSTRACT

A process for producing a slurry comprising dissolving a small amount of an acid selected from citric, tartaric, adipic, fumaric, and maleic in a solvent selected from dimethylacetamide and dimethylformamide wherein the amounts of solvent and titanium dioxide are about 17–40 and 60–83 weight percent respectively; and a composition made by the above process.

9 Claims, No Drawings

PROCESS FOR PREPARING A HIGH CONCENTRATION OF TITANIUM DIOXIDE SLURRY IN DIMETHYLACETAMIDE OR DIMETHYLFORMAMIDE

BACKGROUND OF THE INVENTION

Titanium dioxide is useful for pigmenting certain fiber-forming polymers which are usually spun from solutions in dimethylacetamide or dimethylformamide. Titanium dioxide is added to such a fiber-forming solution in the form of a well dispersed mixture or slurry of titanium dioxide in dimethylacetamide or dimethylformamide. It is known that up to 50 weight percent of titanium dioxide can be prepared as a slurry in dimethylacetamide or dimethylformamide (U.S. Pat. No. 2,999,839, Col. 3, line 67). From an economic viewpoint, it is advantageous to prepare titanium dioxide and dimethylacetamide or dimethylformamide slurries which contain very high concentrations of titanium dioxide because less space is required to store the slurry, more efficient use is made of mixing equipment, and better dispersion quality is achieved.

SUMMARY OF THE INVENTION

The present invention concerns preparation of titanium dioxide and dimethylacetamide or dimethylformamide slurries containing up to 83 weight percent of titanium dioxide.

This invention relates to a process for producing a slurry comprising:
 a. dissolving a small amount of an acid selected from citric, tartaric, adipic, fumaric, and maleic in a solvent selected from dimethylacetamide or dimethylformamide, and
 b. dispersing titanium dioxide in the acid-solvent solution.

The amount of titanium dioxide is about 60-83 weight percent based on the titanium dioxide and solvent, and the amount of acid is about 0.1-0.6 weight percent based on the titanium dioxide. When the amount of titanium dioxide is greater than about 76 weight percent based on the titanium dioxide and solvent, then the weight percent of acid is at least about 0.2.

This invention also relates to a composition consisting essentially of an acid selected from citric, tartaric, adipic, fumaric, and maleic; a solvent selected from dimethylacetamide and dimethylformamide; and titanium dioxide. Consisting essentially of means that unspecified ingredients which do not materially affect the basic and novel characteristics of the composition can be included in the composition. The amount of titanium dioxide is about 60-83 weight percent based on the titanium dioxide and solvent, and the amount of acid is about 0.1-0.6 weight percent based on the titanium dioxide. When the amount of titanium dioxide is greater than about 76 weight percent based on the titanium dioxide and solvent, then the weight percent of acid is at least about 0.2.

DETAILED DESCRIPTION OF THE INVENTION

The titanium dioxide slurry of this invention is useful for pigmenting certain fiber-forming polymers such as spandex, acrylic, or aramid polymers which can be dissolved in and spun from dimethylacetamide or dimethylformamide.

In a preferrd embodiment of the present invention, about 18-24 weight percent of solvent and about 76-82 weight percent of titanium dioxide are present based on the titanium dioxide and solvent, and about 0.25-0.45 weight percent of acid is present based on the titanium dioxide. More preferably, about 20 weight percent of solvent and about 80 weight percent of titanium dioxide are present based on the titanium dioxide and solvent, and about 0.3-0.4 weight percent acid is present based on the titanium dioxide. The preferred solvent is dimethylacetamide, and the preferred acid is citric.

At lower acid concentrations than the amount above mentioned, the resulting titanium dioxide mixture tends to form a heavy paste which is not easily processible on standard equipment, such as high-speed disc impeller mills or media mills, and is less useful for pigmenting fiber-forming polymers spun from dimethylacetamide or dimethylformamide. Higher acid concentrations than those mentioned above provide no additional advantages.

The slurry of the present invention can be media milled (e.g., sand milled) using conventional methods to improve the dispersion quality by breaking up unacceptably large agglomerates in the slurry. Dispersion quality can be measured by standard procedures, such as filtration through a fine pored screen, microscopic examination of particle size distribution, or sedimentation techniques.

The slurry of the present invention is particularly useful for producing pigmented segmented polyurethane fibers. Segmented polyurethane fibers, known as spandex, are further described in Saunders and Frisch, *Polyurethane: Chemistry and Technology Part II*, "Spandex Fibers" published by Interscience Publishers (1964). In this use, the titanium dioxide slurry is injected into a standard segmented polyurethane spinning solution at a rate controlled to provide the desired concentration of pigment in the final spinning solution. The segmented polyurethane spinning solution contains about 10-40 parts by weight of the segmented polyurethane polymer and about 60-90 parts by weight of dimethylacetamide and small amounts of other additives such as stabilizers. Generally, the slurry of the present invention is injected into a segmented polyurethane spinning solution so that about 0.5-10 weight percent titanium dioxide is present based on the weight of the segmented polyurethane polymer. After thoroughly mixing the pigment slurry with the spinning solution, the composition can be wet-spun or dry-spun according to conventional techniques.

The following examples illustrate this invention. All parts, percentages, and proportions are by weight unless otherwise specified.

EXAMPLE 1

An 80% titanium dioxide slurry is made by the following procedure: dimethylacetamide (543 grams) and citric acid (7.0 grams) are added to a 4-liter stainless steel pot attached to a high-speed disc impeller mill equipped with a 4-inch blade. "Ti-Pure" titanium dioxide R-902 (2200 grams), manufactured by E. I. du Pont de Nemours and Company, is stirred into the pot and the mixture is ground on the mill at 3000 rpm for 30 minutes. The slurry is sand milled by conventional methods, and then is ready for use in pigmenting applications.

EXAMPLE 2

Slurries containing about 60–82% titanium dioxide are prepared according to the methods of Example 1. Table A shows the weight percent of titanium dioxide, citric acid, and dimethyl acetamide; and also the viscosities of the resulting slurry as measured with a Brookfield viscometer at 25° C. and 100 rpm.

TABLE A

| ** Weight Percent Titanium Dioxide | Weight Percent Citric Acid Based on Titanium Dioxide | ** Weight Percent Dimethyl-acetamide | Brookfield Viscosity (cps) |
|---|---|---|---|
| 60 | 0 | 40 | 5000 |
| 60 | 0.1 | 40 | 1180 |
| 60 | 0.2 | 40 | 48 |
| 76 | 0 | 24 | heavy paste * |
| 76 | 0.2 | 24 | 160 |
| 78 | 0.15 | 22 | heavy paste * |
| 78 | 0.20 | 22 | 940 |
| 78 | 0.25 | 22 | 210 |
| 78 | 0.30 | 22 | 200 |
| 78 | 0.35 | 22 | 150 |
| 80 | 0 | 20 | heavy paste * |
| 80 | 0.31 | 20 | 170 |
| 82 | 0 | 18 | heavy paste * |
| 82 | 0.35 | 18 | 800 |

* not processible
** based on titanium dioxide and dimethylacetamide

The viscosities from the above table show that when citric acid is present in the mill base, the mill base is suitable for being processed by standard commercial high-speed dic impeller mills. When citric acid is not present, the mill base has a very high viscosity and can even be in the form of a heavy paste which is not suitable for processing on standard commercial high-speed disc impeller mills.

I claim:

1. A process for producing a slurry comprising:
   a. dissolving an acid selected from citric, tartaric, adipic, fumaric and maleic in a solvent selected from dimethylacetamide and dimethylformamide, and
   b. dispersing titanium dioxide in the acid-solvent solution,
   wherein the amount of titanium dioxide is about 60–83 weight percent based on the titanium dioxide and solvent, and the amount of acid is about 0.2–0.6 weight percent based on the titanium dioxide.

2. The process of claim 1 wherein the acid is citric and the solvent is dimethylacetamide.

3. The process of claim 2 wherein the amount of titanium dioxide is about 76–82 weight percent and the amount of acid is about 0.25–0.45 weight percent.

4. The process of claim 2 wherein the amount of titanium dioxide is about 80 weight percent and the amount of acid is about 0.3–0.4 weight percent.

5. A composition consisting essentially of: an acid selected from citric, tartaric, adipic, fumaric, and maleic; a solvent selected from dimethylacetamide and dimethylformamide; and titanium dioxide; wherein the amount of titanium dioxide is about 60–83 weight percent based on the titanium dioxide and solvent, and the amount of acid is about 0.2–0.6 weight percent based on the titanium dioxide.

6. The composition of claim 5 wherein the acid is citric and the solvent is dimethylacetamide.

7. The composition of claim 6 wherein the amount of titanium dioxide is about 76–82 weight percent and the amount of acid is about 0.25–0.45 weight percent.

8. The composition of claim 6 wherein the amount of titanium dioxide is about 80 weight percent and the amount of citric acid is about 0.3–0.4 weight percent.

9. A process for producing a pigmented segmented polyurethane spinning solution comprising
   a. making the slurry of claim 5, and
   b. adding the slurry of claim 5 to the segmented polyurethane spinning solution containing about 10–40 parts by weight of a segmented polyurethane polymer and about 60–90 parts by weight of dimethylacetamide so that about 0.5–10 weight percent titanium dioxide is present based on the weight of the segmented polyurethane polymer.

* * * * *